(12) United States Patent
Akiyama et al.

(10) Patent No.: US 11,541,507 B2
(45) Date of Patent: Jan. 3, 2023

(54) GRINDING APPARATUS

(71) Applicant: FANUC CORPORATION, Yamanashi (JP)

(72) Inventors: Kazuhiko Akiyama, Yamanashi (JP); Tadanori Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1048 days.

(21) Appl. No.: 16/229,712

(22) Filed: Dec. 21, 2018

(65) Prior Publication Data

US 2019/0193243 A1 Jun. 27, 2019

(30) Foreign Application Priority Data

Dec. 27, 2017 (JP) .............................. JP2017-251946

(51) Int. Cl.
| | |
|---|---|
| *B24B 49/16* | (2006.01) |
| *B25J 11/00* | (2006.01) |
| *B25J 9/16* | (2006.01) |
| *B25J 13/08* | (2006.01) |
| *B24B 9/04* | (2006.01) |
| *B24B 49/18* | (2006.01) |
| *B25J 9/00* | (2006.01) |
| *B25J 15/00* | (2006.01) |

(52) U.S. Cl.
CPC ............... *B24B 49/16* (2013.01); *B24B 9/04* (2013.01); *B24B 49/183* (2013.01); *B25J 9/0096* (2013.01); *B25J 9/16* (2013.01); *B25J 9/1633* (2013.01); *B25J 11/0065* (2013.01); *B25J 13/085* (2013.01); *B25J 15/0019* (2013.01)

(58) Field of Classification Search
CPC ....... B24B 49/10; B24B 49/16; B24B 49/183; B24B 9/04; B24B 9/06; B24B 9/005; B23Q 15/28; B23Q 15/22; B23Q 15/24
See application file for complete search history.

(56) References Cited

U.S. PATENT DOCUMENTS

2015/0005923 A1* 1/2015 Gu ...................... B24B 27/0038
901/41

FOREIGN PATENT DOCUMENTS

| CN | 101821027 A | 9/2010 |
|---|---|---|
| CN | 106392852 A | 2/2017 |
| CN | 106681276 A | 5/2017 |

(Continued)

OTHER PUBLICATIONS

English Abstract and Machine Translation for Japanese Publication No. 2006-058961 A, published Mar. 2, 2006, 17 pgs.

(Continued)

*Primary Examiner* — Joel D Crandall
(74) *Attorney, Agent, or Firm* — Fredrikson & Byron, P.A.

(57) ABSTRACT

A grinding apparatus including a robot, a grinding tool attached to the robot, a force sensor configured to detect a force exerted on the grinding tool, and a controller connected with the force sensor and configured to control the robot. The controller includes a variation acquiring section configured to acquire the present position of the robot by pressing the grinding tool against a reference surface in such a manner that a pressing force detected by the force sensor is constant, and to acquire a difference between the acquired present position and a reference position of the robot stored in advance, the difference being acquired as a variation of the grinding tool.

7 Claims, 8 Drawing Sheets

(56) References Cited

FOREIGN PATENT DOCUMENTS

| CN | 106979902 A | 7/2017 |
|---|---|---|
| JP | 60242966 A | 12/1985 |
| JP | 6368354 A | 3/1988 |
| JP | 5228823 A | 9/1993 |
| JP | 10315131 A | 12/1998 |
| JP | 200658961 A | 3/2006 |
| JP | 2015160303 A | 9/2015 |

OTHER PUBLICATIONS

English Abstract and Machine Translation for Japanese Publication No. H05-228823 A, published Sep. 7, 1993, 13 pgs.
English Abstract and Machine Translation for Japanese Publication No. S63-068354 A, published Mar. 28, 1988, 10 pgs.
English Abstract and Machine Translation for Japanese Publication No. JPH10-315131 A, published Dec. 2, 1998, 29 pgs.
English Abstract and Machine Translation for Chinese Publication No. CN 101821027 A, published Sep. 1, 2010, 15 pgs.
English Abstract and Machine Translation for Chinese Publication No. CN 106392852 A, published Feb. 15, 2017, 8 pgs.
English Abstract and Machine Translation for Chinese Publication No. CN 106681276 A, published May 17, 2017, 15 pgs.
English Abstract and Machine Translation for Chinese Publication No. CN 106979902 A, published Jul. 25, 2017, 9 pgs.
English Abstract and Machine Translation for Japanese Publication No. 2015-160303 A, published Sep. 7, 2015, 15 pgs.
English Abstract and Machine Translation for Japanese Publication No. S60-242966 A, published Dec. 2, 1985, 11 pages.

* cited by examiner

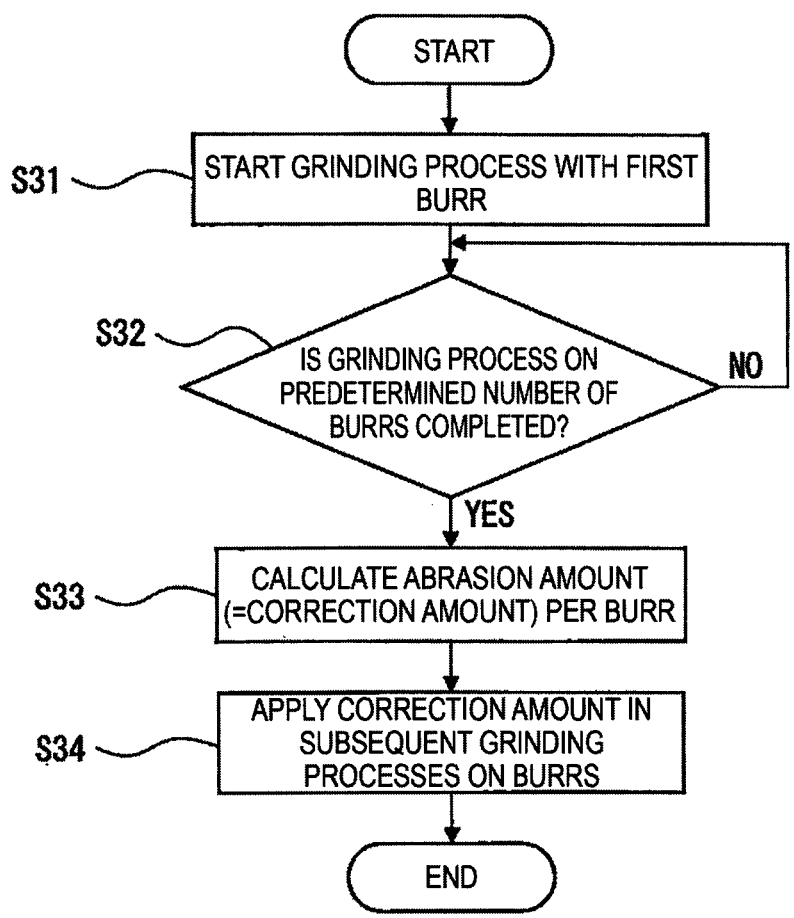

GRINDING APPARATUS

BACKGROUND OF THE INVENTION

1. Field of the Invention

The present invention relates to a grinding apparatus for grinding a workpiece.

2. Description of the Related Art

It is desirable that a grinding apparatus for grinding the surface of various types of workpieces maintain the grinding quality. For example, a grinding apparatus that acquires, for the purpose of maintaining the grinding quality, the variation in the profile of a grinding pad on a grinding table due to the repetitive dressing of the grinding pad is known (see, e.g., Japanese Patent Application Laid-Open No. 2015-160303).

SUMMARY OF THE INVENTION

Incidentally, in a grinding apparatus that performs grinding of a welding bead, burr removal and the like, a grinding tool (such as a rotary grindstone) may be worn when the grinding operation is repeated, and the position where the tool makes contact with the workpiece may be varied, affecting the grinding quality. A general technique for measuring such abrasion of the tool includes providing a process for measuring the abrasion amount by using a dedicated measurement apparatus, such as an optical sensor, which is configured to measure the abrasion amount of the tool and is separately installed in addition to the grinding apparatus. The measuring of the abrasion amount using such a dedicated measurement apparatus, however, leads to increase in working hours and working cost. It is desirable to measure the abrasion amount of the tool without using such a dedicated measurement apparatus.

A first aspect of the present disclosure is a grinding apparatus including: a robot; a grinding tool attached to the robot; a force sensor configured to detect a force exerted on the grinding tool; and a controller connected with the force sensor and configured to control the robot, in which the controller includes a variation acquiring section, the variation acquiring section being configured to acquire a present position of the robot by pressing the grinding tool against a reference surface in such a manner that a pressing force detected by the force sensor is constant, and to acquire a difference between the acquired present position and a reference position of the robot stored in advance, the difference being acquired as a variation of the grinding tool.

BRIEF DESCRIPTION OF THE DRAWINGS

The objects, features and advantages of the invention will become more apparent from the following description of the embodiments in connection with the accompanying drawings, wherein: in the accompanying drawings, FIG. 1A schematically illustrates a configuration of a grinding apparatus according to an embodiment;

FIG. 15 is a flowchart of abrasion amount measurement and position correction of the workpiece illustrated in FIG. 14.

DETAILED DESCRIPTION

Figure 1A:
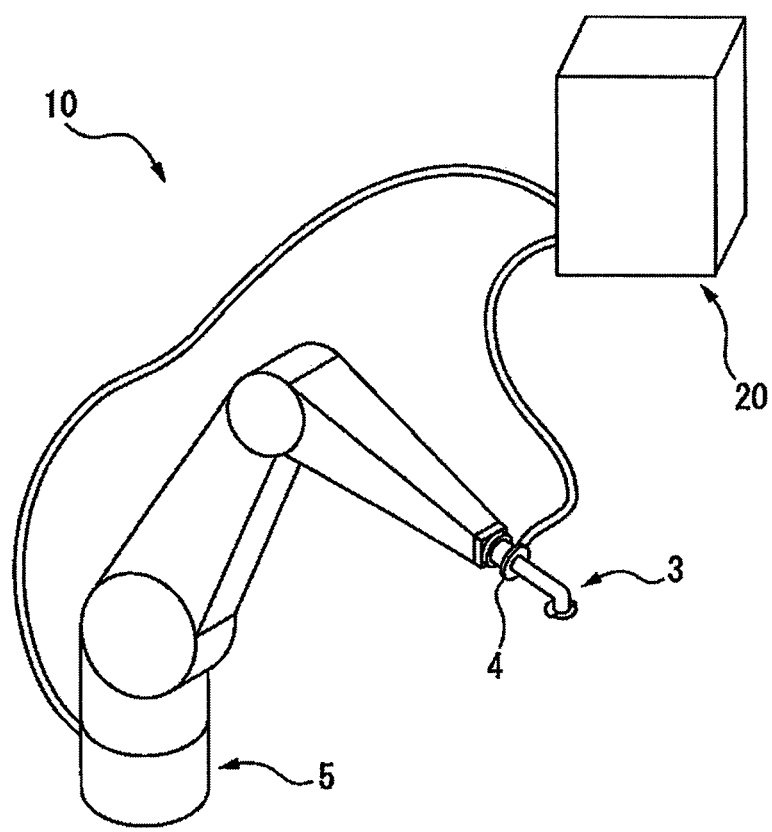
FIG. 1B illustrates a region around a grinding tool of a robot tip in an enlarged manner.

Embodiments of the present invention will be described below with reference to the accompanying drawings. Throughout the drawings, corresponding components are denoted by common reference numerals. To make it easy to understand the drawings, scales of the drawings are appropriately changed. Note that modes illustrated in the drawings are merely examples to implement the invention, and the invention is not limited to the modes illustrated.

Figure 1B:
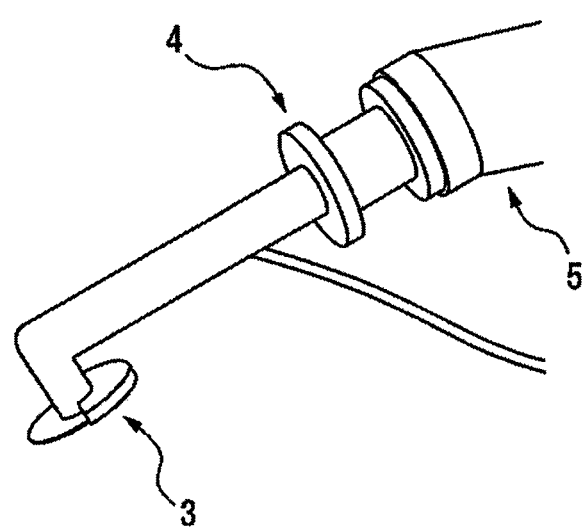

FIG. 1A schematically illustrates an overall configuration of a grinding apparatus 10 according to an embodiment of the present disclosure. FIG. 1B illustrates a region around a grinding tool of a robot tip of FIG. 1A in an enlarged manner. As illustrated in FIGS. 1A and 1B, the grinding apparatus 10 includes a robot 5, and a controller 20 for controlling the robot 5. The robot 5 is a vertical articulated robot including a plurality of arm parts and a plurality of joint parts that couple the plurality of arm parts. A grinding tool 3 is mounted at the wrist tip of the robot 5 via a force sensor 4. The robot 5, the force sensor 4, and the grinding tool 3 are connected with the controller 20. In the controller 20, a grinding program for causing the robot 5 to execute a grinding operation is stored. A teach pendant (not illustrated in the drawing) for performing a teaching input may be connected with the controller 20.

A detection signal from the force sensor 4 is input to the controller 20. The force sensor 4 is a sensor for measuring a force exerted on the grinding tool 3. The force sensor 4 may have a general configuration. For example, the force sensor 4 is a strain gage sensor capable of detecting a triaxial force component and a triaxial torque component (moment). In the grinding apparatus 10, the force sensor 4 detects the force exerted on the grinding tool 3 in the grinding of a workpiece, and provides the detected value to the controller 20.

Figure 2A:
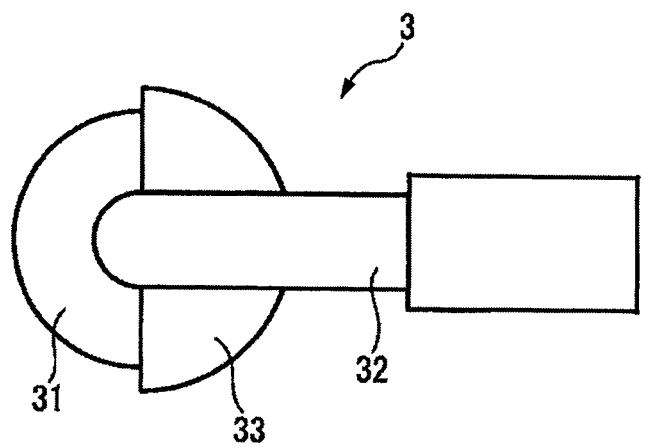
FIG. 2A is a plan view of the grinding tool.
Figure 2B:
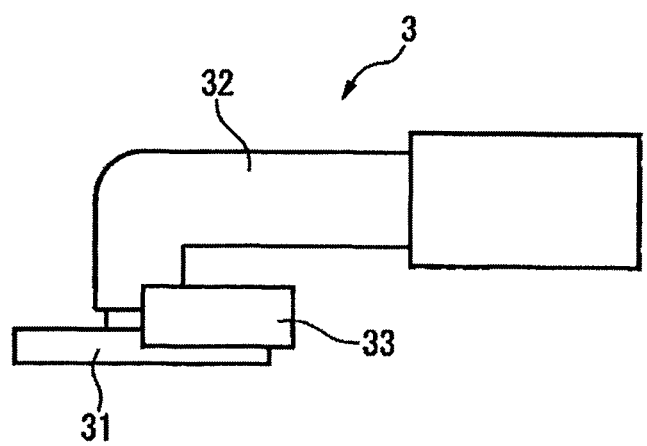
FIG. 2B is a side view of the grinding tool.

Various types of tools may be used as the grinding tool 3. In the following description, the grinding tool 3 is of a type that includes a rotary grindstone as illustrated in FIGS. 2A and 2B, for example. FIG. 2A and FIG. 2B are a plan view and a side view of the grinding tool 3, respectively. As illustrated in FIG. 2A and FIG. 2B, the grinding tool 3 includes a rotary grindstone 31, a holding part 32 that rotatably holds the rotary grindstone 31 and transmits a rotational driving force, and a cover part 33 that covers a part of the rotary grindstone 31.

The controller 20 has a function to control an operation such that a workpiece is pressed by the grinding tool 3 with a constant force in a certain direction at all times in a grinding operation (this function is also referred to as a constant force pressing function hereafter). The controller 20 uses a detection signal from the force sensor 4 when executing the constant force pressing function. By performing a grinding operation on a workpiece by using the constant force pressing function, grinding can be performed in the state where the grinding tool 3 is pressed against the workpiece with a constant force at all times in the grinding operation (i.e., occurrence of a situation in which grinding is performed with an excessive force exerted on a welding bead and the like is avoided), and the finished quality of the grinding can be maintained at high quality.

Figure 3:
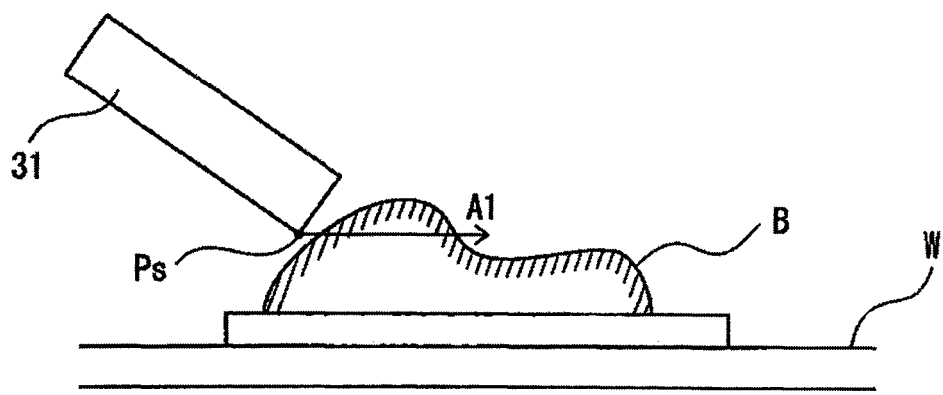
FIG. 3 illustrates a grinding operation.

Now a grinding operation is described with reference to FIG. 3. Here, for example, a grinding operation on a welding bead is described. It is to be noted that, for the convenience of description, FIG. 3 illustrates only the rotary grindstone 31, a workpiece W, and a welding bead B on the workpiece W. In addition, the position Ps in FIG. 3 is a starting point of the grinding operation which is defined by a grinding program in the state where a new grinding tool 3 is attached to the robot 5 for the first time (this point is also referred to as a grinding start point hereafter). In the grinding operation, a corner of the rotary grindstone 31 of the grinding tool 3 is positioned at the start point Ps as illustrated in FIG. 3 in accordance with the grinding program stored in the controller 20, and the rotary grindstone 31 is moved in the direction of an arrow A1 illustrated in FIG. 3 along a movement track according to the grinding program, thereby grinding the welding bead B. As elaborated below, the grinding apparatus 10 according to the present embodiment is configured to measure the variation of the start point Ps based on various factors, and to perform a position correction based on the measurement result such that the rotary grindstone 31 is properly positioned at the start point Ps.

While the factors of variation of the grinding start point may be abrasion, individual differences due to replacement, attaching errors and the like, the measurement method according to the present embodiment can be applied to these factors in the same manner, and therefore a case of abrasion is elaborated below.

When a grinding operation, such as, burr removal or grinding of a welding bead, is performed using the constant force pressing function and the like with the grinding apparatus 10, the tool that performs the grinding (in the present embodiment, the rotary grindstone 31) is worn. When the grinding apparatus 10 is operated by the same grinding program in the case where the rotary grindstone 31 is worn, the position of the rotary grindstone 31 with respect to the workpiece varies, and the grinding quality might be reduced. To prevent such a problem, the grinding apparatus 10 according to the present embodiment has an abrasion amount measuring function of measuring the abrasion amount of the rotary grindstone 31 in the grinding tool 3 by using the constant force pressing function with the force sensor. By correcting the grinding start point (i.e., by correcting the track of the operation of the grinding tool 3) by the amount corresponding to the measured abrasion amount, the positional relationship of the grinding tool 3 with respect to the workpiece can be maintained, and the quality of the grinding operation can be maintained.

Figure 4A:
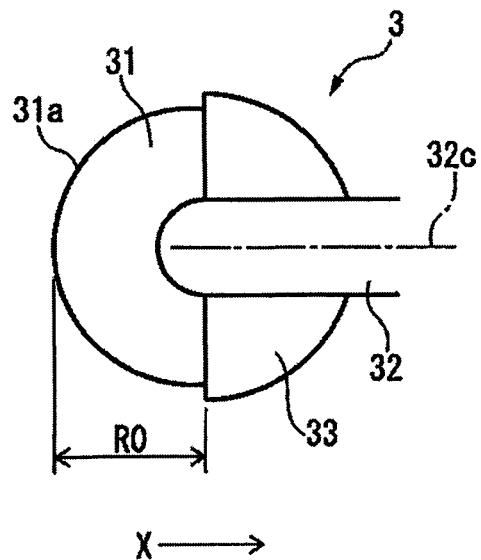
FIG. 4A illustrates a new rotary grindstone which is not worn.
Figure 4B:
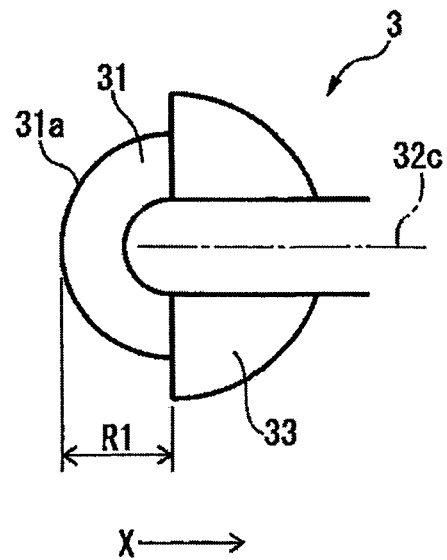
FIG. 4B illustrates a rotary grindstone having an outer diameter of a radius R1 due to abrasion.

Three patterns of abrasion of the rotary grindstone 31 of the grinding tool 3, and measurement methods of the same are described below. FIGS. 4A and 4B illustrate an example case where the rotary grindstone 31 of the grinding tool 3 is worn in the radial direction. Here, for the convenience of description, the direction along a center line 32c of the holding part 32 is defined as the X direction as illustrated in FIGS. 4A and 4B. Such an abrasion pattern can be caused when a grinding operation is executed in the state where a peripheral surface 31a of the rotary grindstone 31 of the grinding tool 3 is pressed against a workpiece. FIG. 4A illustrates a new rotary grindstone 31 which is not worn. The new rotary grindstone 31 has an outer diameter size of a radius R0. FIG. 4B illustrates a rotary grindstone 31 of which an outer diameter has been changed to a radius R1 due to abrasion.

Figure 5:
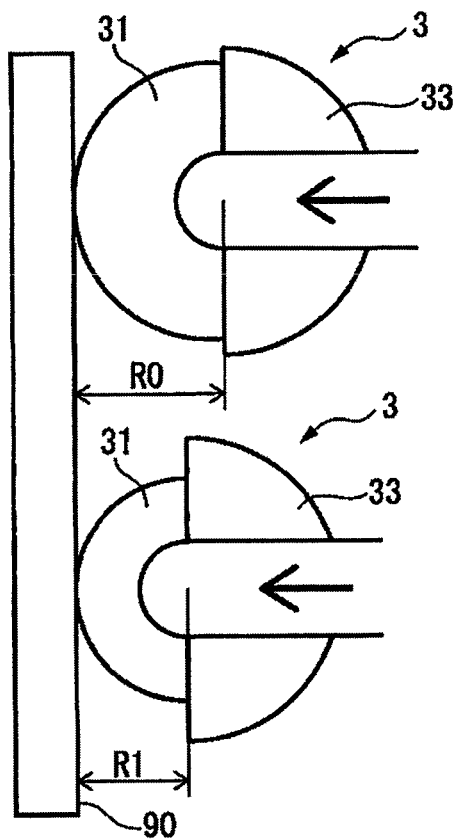
FIG. 5 illustrates a method for measuring an abrasion pattern such as that illustrated in FIGS. 4A and 4B.

FIG. 5 illustrates a method for measuring the abrasion pattern such as that illustrated in FIGS. 4A and 4B. As illustrated in the upper part in FIG. 5, in the case where a new grinding tool 3 is attached to the robot 5, the controller 20 presses the rotary grindstone 31 of the grinding tool 3 against a wall surface 90, which is a reference surface perpendicular to the X direction, with a constant force of the constant force pressing function. At this time, the position and orientation of the robot 5 in a coordinate system defined for the robot 5 are acquired. Below, the position of the robot 5 determined by a first measurement in the above-mentioned manner in the case where the new grinding tool 3 is attached to the robot 5 is defined as a reference position (P0). After the rotary grindstone 31 of the grinding tool 3 is worn, the controller 20 again presses the rotary grindstone 31 of the grinding tool 3 against the wall surface 90 with the same constant force and orientation as those of the measurement with the new grinding tool 3 by using the constant force pressing function. In this case, the same orientation corresponds to pressing the rotary grindstone 31 of the grinding tool 3 against the wall surface 90 in the X direction as in the case where the reference position is acquired. Since the amount and direction of the force exerted on the grinding tool 3 are simultaneously detected by the force sensor 4, the grinding tool 3 can be securely pressed in the X direction with a constant force by confirming the detection result of the force sensor 4. In the above-mentioned manner, a present position (P1) of the robot 5 in the case where the worn grinding tool 3 is attached to the robot 5 is determined.

The difference between the reference position P0 and the present position P1 in the X direction is equal to the difference (R0−R1) between the radius R0 of the new rotary grindstone 31 and the radius R1 of the worn rotary grindstone 31.

Accordingly, an abrasion amount ΔX of the rotary grindstone 31 is determined by the above-mentioned measurement. Here, the variation of the grinding tool is determined as an abrasion amount by using the same constant force and the same orientation between the measurement with the new grinding tool attached to the robot and the measurement with the worn grinding tool attached to the robot while detecting the actual amount and direction of the force applied to the grinding tool with the force sensor, and thus the variation of the grinding tool can be determined with high accuracy.

In the subsequent grinding operations, the controller 20 shifts the position (the grinding start point) of the grinding tool 3 in the X direction by the determined abrasion amount ΔX in the X direction. In this manner, also in the subsequent grinding operations, the positional relationship of the rotary grindstone 31 of the grinding tool 3 with respect to the workpiece can be maintained, and the grinding operation can be performed by bringing the grinding tool 3 into contact with the workpiece in an ideal state. Thus, the quality of the grinding operation can be maintained.

Figure 6A:
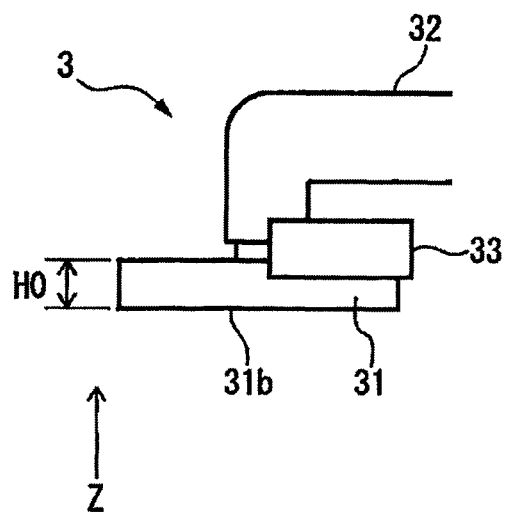
FIG. 6A illustrates a new rotary grindstone which is not worn.
Figure 6B:
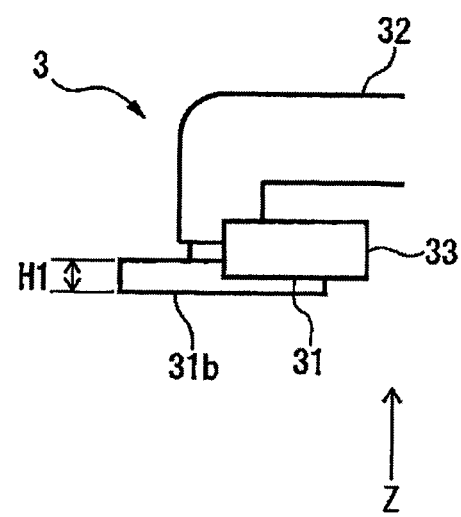
FIG. 6B illustrates a rotary grindstone having a thickness H1 due to abrasion.

FIGS. 6A and 6B illustrate an example case where the rotary grindstone 31 of the grinding tool 3 is worn in the thickness direction (the Z direction). Such an abrasion pattern can be caused when a grinding operation is executed in the state where a bottom surface 31b of the rotary grindstone 31 of the grinding tool 3 is pressed against a workpiece. FIG. 6A illustrates a new rotary grindstone 31 which is not worn. The new rotary grindstone 31 has a thickness H0. FIG. 6B illustrates the rotary grindstone 31 of which the size has been changed to a thickness H1 due to abrasion.

Figure 7A:
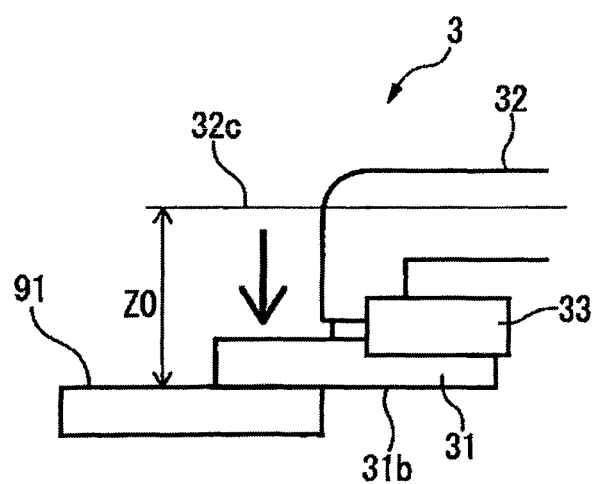
FIG. 7A illustrates a method for measuring an abrasion pattern such as that illustrated in FIGS. 6A and 6B.
Figure 7B:
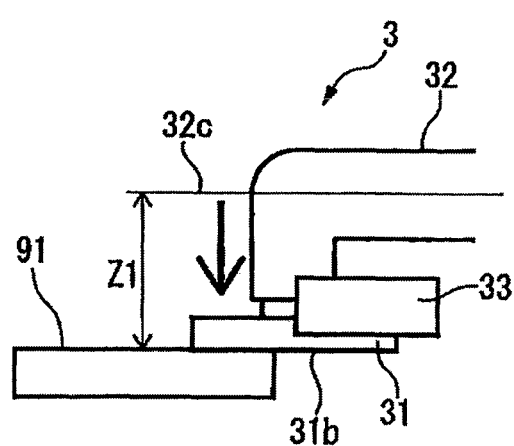
FIG. 7B illustrates a method for measuring an abrasion pattern such as that illustrated in FIGS. 6A and 6B.

FIGS. 7A and 7B illustrate a method for measuring the abrasion pattern such as that illustrated in FIGS. 6A and 6B. As illustrated in FIG. 7A, in the case where the new grinding tool 3 is attached to the robot 5, the controller 20 presses the rotary grindstone 31 of the grinding tool 3 against a reference surface 91 (e.g., a table surface for installing a workpiece) perpendicular to the direction of the Z-axis with a constant force of the constant force pressing function. In this manner, for example, the reference position of the robot 5 in a coordinate system defined for the robot 5 is determined. After the rotary grindstone 31 of the grinding tool 3 is worn, the controller 20 again presses the rotary grindstone 31 of the grinding tool 3 against the reference surface 91, by using the constant force pressing function, with the same constant force and orientation as those used in the measurement of the new grinding tool 3 (see FIG. 7B). In this case, the same orientation corresponds to pressing the rotary grindstone 31 of the grinding tool 3 against the wall surface 91 in the Z direction as in the acquisition of the reference position. Since the amount and direction of the force exerted on the grinding tool 3 are simultaneously detected by the force sensor 4, the grinding tool 3 can be securely pressed in the Z direction with a constant force by confirming the detection result of the force sensor 4. In the above-mentioned manner, the present position of the robot 5 is acquired. It is to be noted that, in FIGS. 7A and 7B, the distance Z0 indicates a distance between the reference surface 91 and the center line 32c of the holding part 32 in the new grinding tool 3, and the distance Z1 indicates a distance between the reference surface 91 and the center line 32c of the holding part 32 in the worn grinding tool 3. Accordingly, the difference between the reference position and the present position in the Z direction is the difference between the distance Z0 and the distance Z1, i.e., the difference between the reference position and the present position in the Z direction is equal to the difference between the thickness H0 of the new rotary grindstone 31 and the thickness H1 of the worn rotary grindstone 31. Thus, the abrasion amount ΔZ of the rotary grindstone 31 is determined by the above-mentioned measurement.

In the subsequent grinding operations, the controller 20 shifts the position of the grinding tool 3 in the Z direction by the determined abrasion amount ΔZ in the Z direction. In this manner, also in the subsequent grinding operations, the relative positional relationship between the bottom surface of the rotary grindstone 31 of the grinding tool 3 and the workpiece can be maintained, and the quality of the grinding operation can be maintained.

Figure 8A:
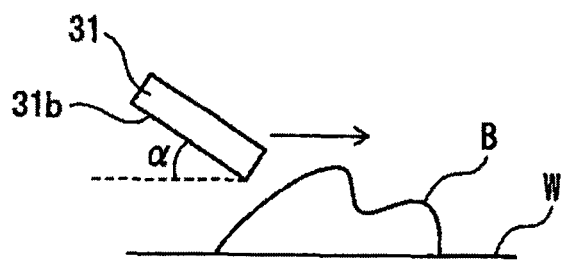
FIG. 8A illustrates a state where a grinding is performed by bringing the rotary grindstone into contact with a welding bead in a slanting direction.

In an actual grinding of a welding bead and the like, the rotary grindstone 31 can be brought into contact with a welding bead in a slanting direction as illustrated in FIG. 8A to perform the grinding operation.

Figure 8B:
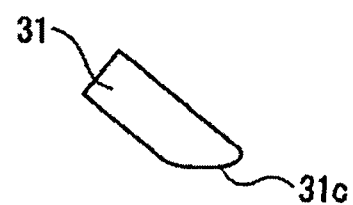
FIG. 8B illustrates an abrasion state of the rotary grindstone.
Figure 9A:
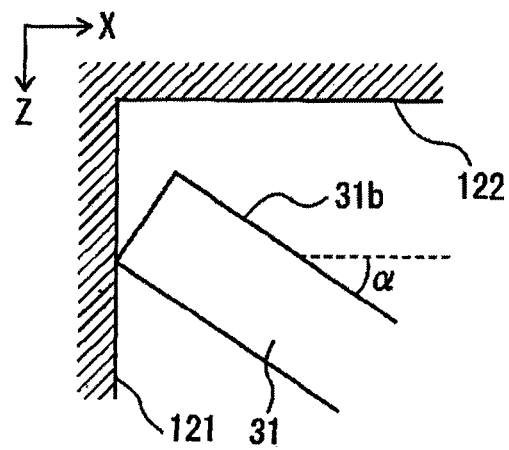
FIG. 9A illustrates a state where a reference position of a robot to which a new grinding tool is attached is acquired in two directions.
Figure 9B:
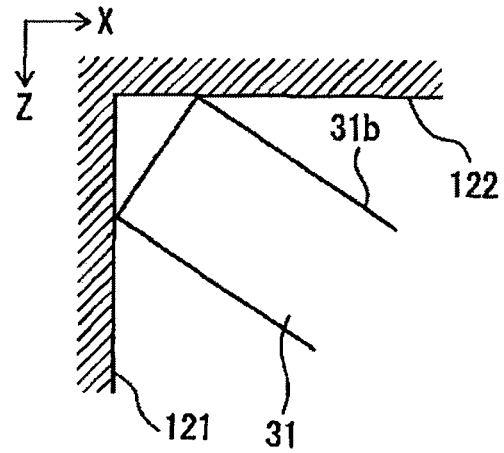
FIG. 9B illustrates a state where a reference position of a robot to which a new grinding tool is attached is acquired in two directions.
Figure 10A:
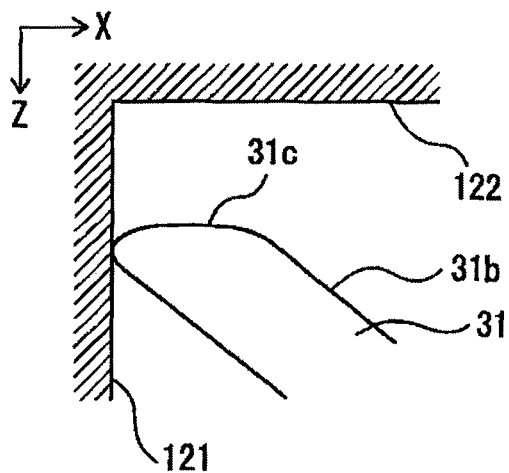
FIG. 10A illustrates a state where a present position of a robot to which a worn grinding tool is attached is acquired in two directions.
Figure 10B:
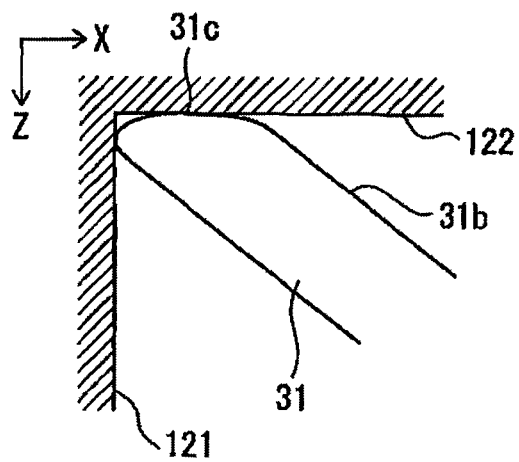
FIG. 10B illustrates a state where a present position of a robot to which a worn grinding tool is attached is acquired in two directions.

In this case, as illustrated in FIG. 8B, the abrasion of the rotary grindstone 31 results in the formation of a cut surface 31c oblique to the bottom surface 31b of the rotary grindstone 31. It is to be noted that, in FIG. 8A, α represents the angle of the bottom surface 31b of the rotary grindstone 31 to a horizontal surface of a workpiece W. FIG. 9A to FIG. 11 illustrate a method for measuring the abrasion amount in the case where a worn surface is formed in a slanting direction as described above. In the measurement of this case, wall surfaces 121 and 122 perpendicular to each other are used as reference surfaces to quickly measure the abrasion amount in two directions (see FIG. 9A). It is to be noted that, in FIG. 9A to FIG. 11, the direction parallel to the wall surface 122 is defined as the X direction, and the direction parallel to the wall surface 121 is defined as the Z direction for the convenience of description. First, as illustrated in FIG. 9A, the rotary grindstone 31 of the new grinding tool 3 is positioned such that the bottom surface 31b is oriented at an angle α to the wall surface 122. Next, in the state where the rotary grindstone 31 of the new grinding tool 3 is pressed against the wall surface 121 with a constant force by using the constant force pressing function of the force sensor 4, the coordinate of the robot 5 is acquired as a reference coordinate Px0. In addition, as illustrated in FIG. 9B, in the state where the rotary grindstone 31 of the new grinding tool 3 is pressed against the wall surface 122 in the Z direction, of the wall surfaces 121 and 122 perpendicular to each other, with a constant force by using the constant force pressing function of the force sensor 4, the coordinate of the robot 5 is acquired as a reference coordinate Pz0.

Next, the rotary grindstone 31 of the worn grinding tool 3 is measured with the same constant pressing force and orientation as those of the measurement of the new rotary grindstone 31. To be more specific, in the state where the rotary grindstone 31 of the worn grinding tool 3 is pressed against the wall surface 121 by using the constant force pressing function with the same constant force as that of the measurement of the new grinding tool 3 such that the bottom surface 31b has the angle α to the wall surface 122 (see FIG. 10A), the coordinate of the robot 5 is acquired as an after-abrasion X-coordinate Px1. The difference between the reference coordinate Px0 and the X-coordinate Px1 after abrasion can be regarded as indicating the abrasion amount ΔX in the X direction. Next, in the state where the grinding tool 3 in the above-mentioned state is pressed against the wall surface 122, by using the constant force pressing function, with the same constant force as that of the measurement of the new grinding tool 3 (see FIG. 10B), the coordinate of the robot 5 is acquired as an after-abrasion Z-coordinate Pz1. The difference between the reference coordinate Pz0 and the after-abrasion Z-coordinate Pz1 can be regarded as indicating the abrasion amount ΔZ in the Z direction. Also in the above-mentioned measurement, by confirming the detection result of the force sensor 4, the rotary grindstone 31 of the grinding tool 3 can be precisely pressed against the wall surface 121 and the wall surface 122 in the X direction and the Z direction as in the acquisition of the reference coordinate. Thus, precise position measurement can be performed.

Figure 11:
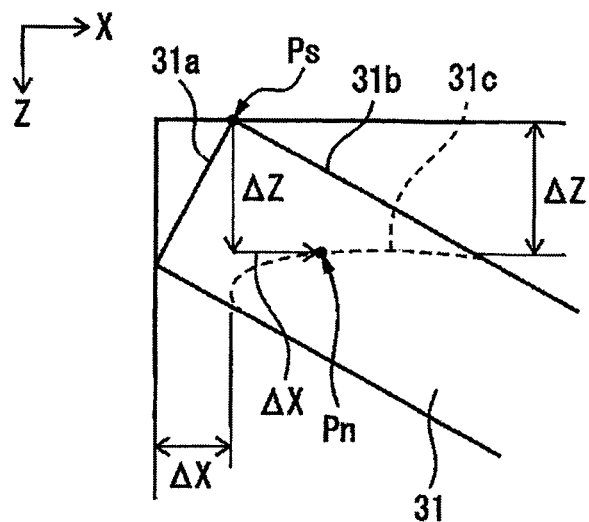
FIG. 11 illustrates a state where a grinding start point is corrected.

In the subsequent grinding operations, the controller 20 shifts the position of the grinding tool 3 in the X direction and the Z direction by the determined abrasion amount ΔX in the X direction and abrasion amount ΔZ in the Z direction. FIG. 11 is an explanatory illustration for explaining where the start point Ps defined at a corner portion between the bottom surface 31b and a peripheral surface part 31a of the new rotary grindstone 31 is defined, as a result of the shift of the coordinate according to the measurement, on the worn rotary grindstone 31. As illustrated in FIG. 11, it is understood that a coordinate Pn determined by shifting the start point Ps defined at the corner portion between the bottom surface 31b and the peripheral surface part 31a of the new rotary grindstone 31 by the abrasion amounts ΔX and ΔZ in the X direction and the Z direction, respectively, can be defined on the tilted abrasion surface 31c of the worn rotary grindstone 31. It is to be noted that, depending on the actual shape of the abrasion, the actual shift amount may be set by modifying the abrasion amounts ΔX and ΔZ determined by the above-described measurement on the basis of experimental values and the like. In this manner, also in the subsequent grinding operations, the relative positional relationship between the peripheral surface of the rotary grindstone 31 of the grinding tool 3 and the workpiece can be maintained, and the quality of the grinding operation can be maintained.

In the exemplary measurement described with reference to FIG. 4A to FIG. 11, the abrasion amount of the grinding tool 3 is determined by measuring the position of the robot 5 in the case where the worn grinding tool 3 is attached to the robot 5 with respect to the reference position of the robot 5 in the case where the new grinding tool 3 is attached to the robot 5 by using the constant force pressing function using the force sensor 4. Such a measurement method can be applied not only to the abrasion amount, but also to the position correction and the like after the replacement of a grinding tool for maintenance and the like. An example case where a grinding tool is replaced with a new grinding tool for maintenance and the like is considered. In this case, the position of the new grinding tool 3 after replacement is measured by the same method as the above-described measurement method by using the position which was measured when the grinding tool 3 to be replaced was new, as a reference position. Then, the difference between the reference position of the grinding tool before replacement and the present position of the replaced grinding tool is determined. The difference value of this case indicates an individual difference and/or an attaching error of the grinding tools. Also in this case, by correcting the start point of the grinding operation by using the difference value, the influence of the individual difference and/or the attaching error on the grinding operation can be eliminated, and an ideal grinding operation can be maintained.

Figure 12:
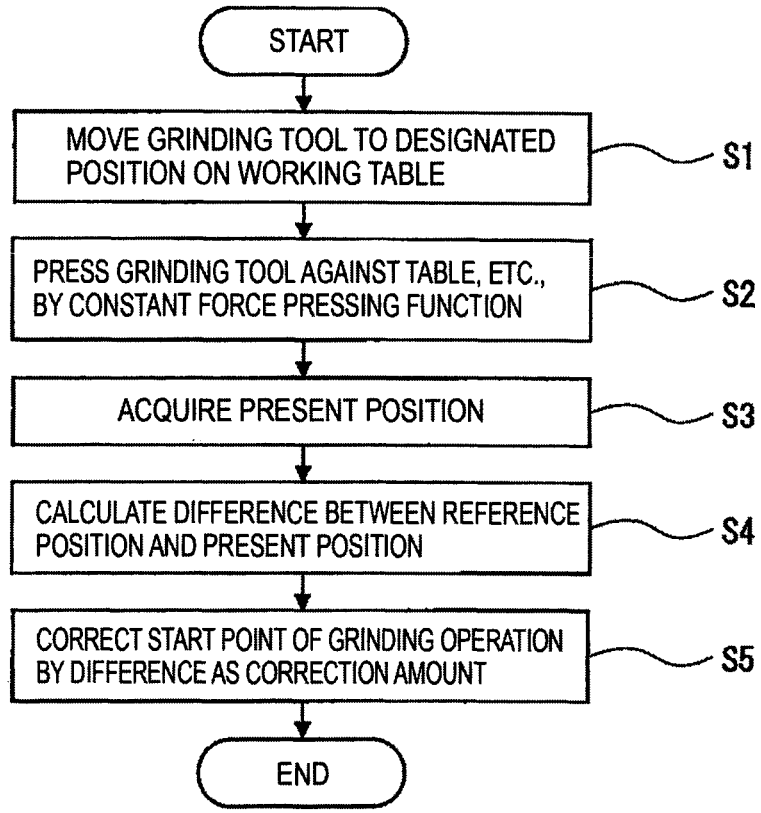
FIG. 12 is a flowchart of an operation of a variation measurement process.

FIG. 12 is a flowchart illustrating the operations of the above-described variation measurement process. The operations illustrated in FIG. 12 are executed under the control of the controller 20. Here, the reference position of a new grinding tool has been acquired in advance before the process of FIG. 12 is executed. First, at step S1, the controller 20 moves the grinding tool 3 to a designated position on a working table. The designated position on the table is a part of the table having a reference surface suitable for performing the measurement of the abrasion amount, and is a place where the reference position of the new grinding tool has been acquired. Next, the controller 20 presses the grinding tool 3 (the rotary grindstone 31) against a reference surface such as a table by using the constant force pressing function (step S2), and in this state, the controller 20 acquires the present position of the robot 5 (step S3).

Next, the controller 20 calculates a difference between a reference position representing the position of the robot 5 in the case where the new grinding tool is attached to the robot 5, and the present position acquired at step S3. As described above, this difference indicates the abrasion amount, the individual difference, the attaching error and the like of the grinding tool 3. Subsequently, the controller 20 corrects the grinding start point by the difference value determined at step S4 as a correction amount. The correction in this case may be performed by correcting the start point of the grinding track by the above-mentioned difference value, for example (step S5).

Figure 13:
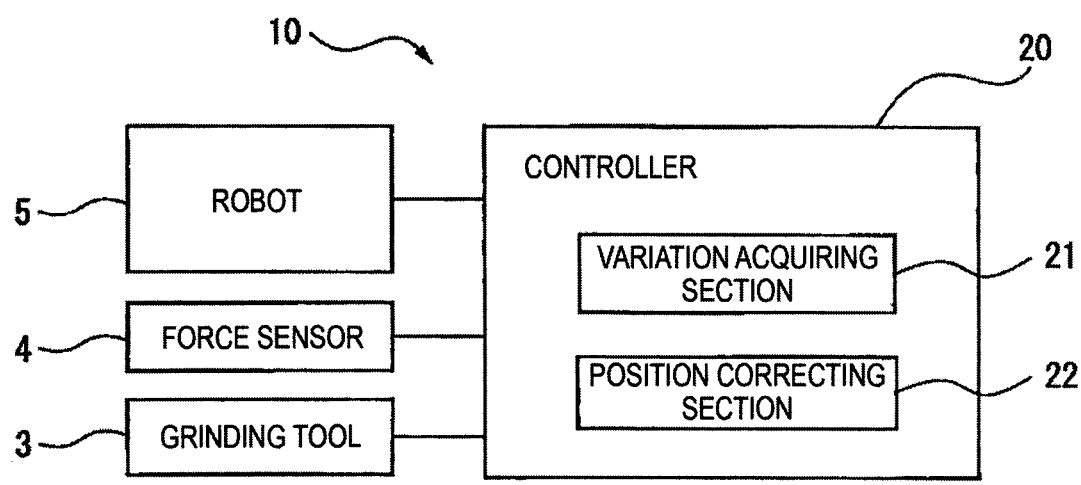
FIG. 13 is a block diagram illustrating a configuration of the grinding apparatus.

FIG. 13 is a block diagram illustrating a configuration of the grinding apparatus 10 that performs the abrasion amount measurement and the position correction described above. As illustrated in FIG. 13, the controller 20 is connected with the robot 5, the force sensor 4, and the grinding tool 3. The controller 20 may have a configuration of a generally used computer including a CPU, a ROM, a RAM, a storage device and the like. The controller 20 includes: a variation acquiring section 21 that acquires the present position of the robot 5 by pressing the grinding tool 3 against the reference surface such that the pressing force detected by the force sensor 4 is constant, and acquires the difference between the acquired present position and the reference position as the variation of the grinding tool 3; and a position correcting section 22 that corrects the start point of the grinding operation of the grinding tool 3 based on the acquired variation.

Next, a specific example case where the above-described method for measuring the abrasion amount is applied to a general workpiece having a plurality of working points is described with reference to FIGS. 14 and 15.

Figure 14:
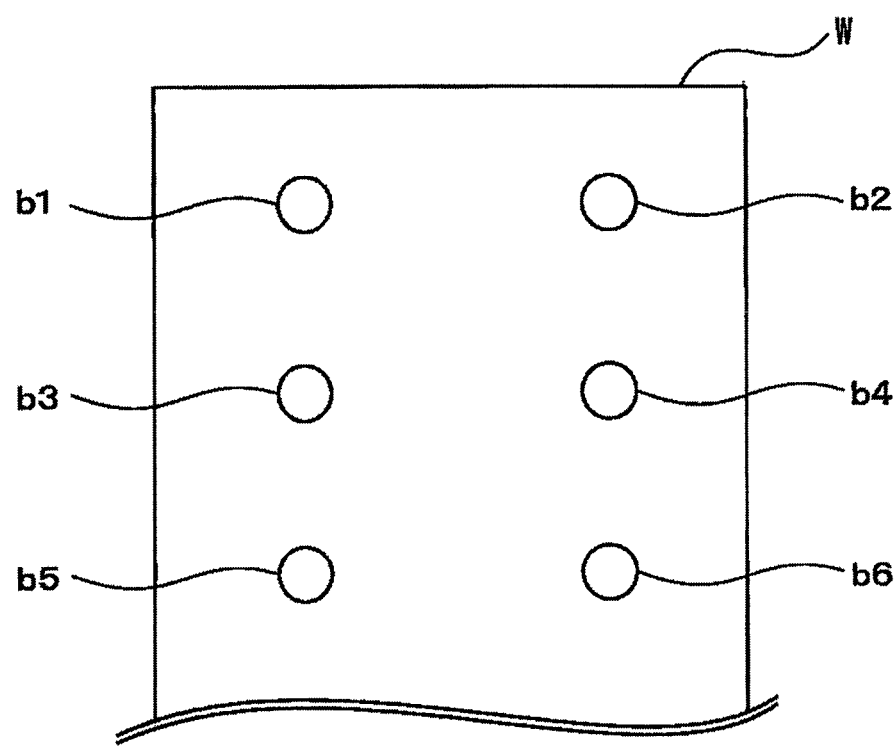
FIG. 14 is a schematic view of a workpiece having a plurality of working points.

Here, a case where a workpiece W includes a plurality of similar burrs (b1, b2, b3, b4, b5, b6 . . . ) is considered as illustrated in FIG. 14. In the case where a high-quality grinding process is required for the above-mentioned workpiece W, it is desirable to correct the variation of the position of the grinding tool 3 resulting from abrasion every time when the grinding process is performed on each burr. Accordingly, the grinding process on the workpiece W is performed in an operation flow as illustrated in FIG. 15 in consideration of the fact that a precise abrasion amount is determined by the abrasion amount measurement process according to the present embodiment.

First, starting with a burr at a first point (the burr b1 in the example illustrated in FIG. 14), a grinding process is sequentially performed (step S31). Next, it is determined whether the grinding process has been performed on a predetermined number of burrs (step S32). Here, the predetermined number is four (the burrs b1 to b4), for example. When the grinding process has not been performed on the predetermined number of burrs, a standby is kept until the grinding process is performed on the predetermined number of burrs (S32: NO). When the grinding process has been performed on the predetermined number of burrs (S32: YES), the abrasion amount of the grinding tool 3 is measured by a method in accordance with the abrasion amount measurement process of FIG. 12. The abrasion amount determined here is the sum of the abrasion amounts of the processes on the burrs of four places, and therefore an average abrasion amount per burr is determined by dividing the abrasion amount by the number (four, in this case) of the processed burrs (step S33). Thereafter, the operation of correcting the position of the grinding tool 3 by the abrasion amount determined at step S33 is executed every time when the grinding process on each burr is completed (step S34).

With the operations described above, once the average abrasion amount per burr is determined, the abrasion amount measurement of the burr in every subsequent process is unnecessary, and thus the total time required for the process can be reduced while maintaining the quality of the grinding operation.

According to the embodiment described above, a dedicated sensor and the like for measuring the abrasion amount of the grinding tool and the like are not required to be employed, and the grinding start point can be corrected by precisely measuring the abrasion amount and the like by using the constant force pressing function of the force sensor provided in the grinding apparatus for the grinding operation. Accordingly, the time and/or man-hours required for the steps for the abrasion amount measurement can be significantly reduced.

Since the detection result of the force sensor is used for the acquisition of the position of the grinding tool, the present position of the robot can be acquired in the state where the amount and direction of the force exerted on the grinding tool when the reference position is determined are precisely reproduced.

In particular, in the present embodiment, the track of the grinding operation is corrected by correcting the start point of the grinding operation by using the variation which is measured with the worn grinding tool and the like, and it is not necessary to change the grinding program itself (i.e., it is not necessary to repeat a teaching input).

While the reference position is measured and acquired when the new grinding tool 3 is attached to the robot 5 for the first time in the embodiment, the reference position may be calculated based on the dimension specification of the grinding tool 3, for example.

While the invention has been described with reference to specific embodiments, it will be understood, by those skilled in the art, that various changes or modifications may be made thereto without departing from the scope of the following claims.

While an example of the grinding apparatus in which the grinding tool is attached to a vertical articulated robot is described in the embodiment, the configuration of the grinding apparatus is not limited to the above-mentioned example. The configuration of the embodiment may be applied to configurations of grinding apparatuses using various types of robots.

In the variation measurement process described with FIG. 12, the present position with respect to the reference position might be larger than a predetermined threshold when abrasion of the grinding tool is largely progressed, and/or when the grinding tool after replacement is not properly attached. In view of this, when the present position with respect to the reference position is larger than a predetermined threshold, an alarm (display alarm and/or sound alarm) may be given to the operator.

In addition, the method for variation measurement and grinding start point correction of the embodiment has an advantage that a desired grinding operation can be continued without changing the grinding program itself even when the method is executed with a grinding tool of a different type attached to the robot 5.

In addition, to solve the problems, the present disclosure can provide the following various aspects and the effects thereof. It is to be noted that the numbers in parentheses in the following description of the aspects correspond to the reference numerals in the drawings of the present disclosure.

For example, a first aspect of the present disclosure is a grinding apparatus (10) including: a robot (5); a grinding tool (3) attached to the robot (5); a force sensor (4) configured to detect a force exerted on the grinding tool (3); and a controller (20) connected with the force sensor (4) and configured to control the robot (5), in which the controller (20) includes a variation acquiring section (21), the variation acquiring section (21) being configured to acquire a present position of the robot (5) by pressing the grinding tool (3) against a reference surface in such a manner that a pressing force detected by the force sensor (4) is constant, and to acquire a difference between the acquired present position and a reference position of the robot (5) stored in advance, the difference being acquired as a variation of the grinding tool (3).

According to the first aspect, without employing a dedicated sensor for measuring the abrasion amount of the grinding tool and the like, the abrasion amount and the like can be precisely measured by using the constant force pressing function of the force sensor provided in the grinding apparatus for the grinding operation, and the measured abrasion amount and the like can be used for correction and the like.

A second aspect of the present disclosure is the grinding apparatus (10) of the first aspect of the present disclosure in which the controller (20) further includes a position correcting section (22) configured to correct a start point of a grinding operation by the grinding tool (3) based on the acquired variation.

A third aspect of the present disclosure is the grinding apparatus (10) of the first or second aspect of the present disclosure in which before the grinding tool (3) is used for a grinding operation, the variation acquiring section (21) acquires the reference position by pressing the grinding tool (3) against the reference surface in such a manner that the pressing force detected by the force sensor (4) is constant.

A fourth aspect of the present disclosure is the grinding apparatus (10) of the third aspect of the present disclosure in which the constant pressing force when the reference position of the robot (5) is acquired and the constant pressing force when the present position of the robot (5) is acquired are equal; and a direction of the constant pressing force detected by the force sensor (4) when the reference position of the robot (5) is acquired, and a direction of the constant pressing force detected by the force sensor (4) when the present position of the robot (5) is acquired are identical.

A fifth aspect of the present disclosure is the grinding apparatus (10) of the third aspect of the present disclosure in which the constant pressing force when the reference position of the robot (5) is acquired, and the constant pressing force when the present position of the robot (5) is acquired are equal; and an orientation of the grinding tool (3) with respect to the reference surface when the reference position of the robot (5) is acquired, and an orientation of the grinding tool (3) with respect to the reference surface when the present position of the robot (5) is acquired are identical.

A sixth aspect of the present disclosure is the grinding apparatus (10) of the first or second aspect of the present disclosure in which the variation acquiring section (21)

acquires the variation of the grinding tool (3) in a first direction by pressing the grinding tool (3) against the reference surface in such a manner that the pressing force detected by the force sensor (4) is constant and that a direction of the pressing force detected by the force sensor (4) is the first direction when acquiring the reference position of the robot (5); and by pressing the grinding tool (3) against the reference surface in such a manner that the pressing force detected by the force sensor (4) is constant and that a direction of the pressing force detected by the force sensor (4) is the first direction when acquiring the present position of the robot (5).

A seventh aspect of the present disclosure is the grinding apparatus (10) of the first or second aspect of the present disclosure in which the reference surface includes a first reference surface and a second reference surface respectively perpendicular to at least two directions; and the variation acquiring section (21) acquires the present position of the grinding tool (3) with respect to components of the at least two directions by pressing the grinding tool (3) against at least the first reference surface and the second reference surface in such a manner that the pressing force detected by the force sensor (4) is constant.

An eighth aspect of the present disclosure is the grinding apparatus (10) of the seventh aspect of the present disclosure in which the at least two directions are a first direction and a second direction; the variation acquiring section (21) acquires a component of the variation in the first direction by pressing the grinding tool (3) against the first reference surface in such a manner that the pressing force detected by the force sensor (4) is constant and that a direction of the pressing force detected by the force sensor (4) is the first direction when acquiring the reference position of the robot (5), and by pressing the grinding tool (3) against the first reference surface in such a manner that the pressing force detected by the force sensor (4) is constant and that the direction of the pressing force detected by the force sensor (4) is the first direction when acquiring the present position of the robot (5); and the variation acquiring section (21) acquires a component of the variation in the second direction by pressing the grinding tool (3) against the second reference surface in such a manner that the pressing force detected by the force sensor (4) is constant and that the direction of the pressing force detected by the force sensor (4) is the second direction when acquiring the reference position of the robot (5), and by pressing the grinding tool (3) against the second reference surface in such a manner that the pressing force detected by the force sensor (4) is constant and that the direction of the pressing force detected by the force sensor (4) is the second direction when acquiring the present position of the robot (5).

A ninth aspect of the present disclosure is the grinding apparatus (10) of any of the first to eighth aspects of the present disclosure in which when the present position is acquired, the grinding tool (3) is in a worn state after a grinding operation; and the variation indicates an abrasion amount of the grinding tool (3).

A tenth aspect of the present disclosure is the grinding apparatus (10) of any of the first to eighth aspects of the present disclosure in which when the present position is acquired, the grinding tool (3) is in a state where the grinding tool (3) is newly attached to the robot (5) by replacing the grinding tool (3) used for the acquisition of the reference position; and the variation indicates a variation relating to at least one of an individual difference and an attaching error of the grinding tool (3) after replacement.

An eleventh aspect of the present disclosure is the grinding apparatus (10) of the second aspect of the present disclosure in which the variation acquiring section (21) determines the variation after a grinding process is performed on a predetermined number of working points of a plurality of working points on a workpiece, and divides the determined variation by the predetermined number to determine an average variation per working point in the grinding process; and the position correcting section (22) corrects the start point of the grinding operation of the grinding tool (3) by using the determined average variation.

The invention claimed is:

1. A grinding apparatus comprising:
   a robot;
   a grinding tool attached to the robot;
   a force sensor configured to detect a force exerted on the grinding tool; and
   a controller connected with the force sensor and configured to control the robot, wherein
   the controller includes a variation acquiring section, the variation acquiring section being configured to acquire a present position of the robot by pressing the grinding tool against a reference surface in such a manner that a pressing force detected by the force sensor is constant, and to acquire a difference between the acquired present position and a reference position of the robot stored in advance, the difference being acquired as a variation of the grinding tool,
   wherein
   the reference surface includes a first reference surface and a second reference surface respectively perpendicular to at least two directions; and
   the variation acquiring section acquires the present position of the grinding tool with respect to components of the at least two directions by pressing the grinding tool against at least the first reference surface and the second reference surface in such a manner that the pressing force detected by the force sensor is constant,
   wherein
   the at least two directions are a first direction and a second direction;
   the variation acquiring section acquires a component of the variation in the first direction
   by pressing the grinding tool against the first reference surface in such a manner that the pressing force detected by the force sensor is constant and that a direction of the pressing force detected by the force sensor is the first direction when acquiring the reference position of the robot, and
   by pressing the grinding tool against the first reference surface in such a manner that the pressing force detected by the force sensor is constant and that the direction of the pressing force detected by the force sensor is the first direction when acquiring the present position of the robot and
   the variation acquiring section acquires a component of the variation in the second direction
   by pressing the grinding tool against the second reference surface in such a manner that the pressing force detected by the force sensor is constant and that the direction of the pressing force detected by the force sensor is the second direction when acquiring the reference position of the robot, and
   by pressing the grinding tool against the second reference surface in such a manner that the pressing force detected by the force sensor is constant and that the direction of the pressing force detected by the force sensor is the second direction when acquiring the present position of the robot.

2. The grinding apparatus according to claim 1, wherein the controller further includes a position correcting section configured to correct a start point of a grinding operation by the grinding tool based on the acquired variation.

3. The grinding apparatus according to claim 2, wherein the variation acquiring section determines the variation after a grinding process is performed on a predetermined number of working points of a plurality of working points on a workpiece, and divides the determined variation by the predetermined number to determine an average variation per working point in the grinding process; and the position correcting section corrects the start point of the grinding operation of the grinding tool by using the determined average variation.

4. The grinding apparatus according to claim 1, wherein before the grinding tool is used for a grinding operation, the variation acquiring section acquires the reference position by pressing the grinding tool against the reference surface in such a manner that the pressing force detected by the force sensor is constant.

5. The grinding apparatus according to claim 4, wherein the constant pressing force when the reference position of the robot is acquired, and the constant pressing force when the present position of the robot is acquired are equal; and an orientation of the grinding tool with respect to the reference surface when the reference position of the robot is acquired, and an orientation of the grinding tool with respect to the reference surface when the present position of the robot is acquired are identical.

6. The grinding apparatus according to claim 1, wherein when the present position is acquired, the grinding tool is in a worn state after a grinding operation; and the variation indicates an abrasion amount of the grinding tool.

7. The grinding apparatus according to claim 1, wherein when a new present position is acquired, the grinding tool is in a state where the grinding tool is newly attached to the robot by replacing the grinding tool used for acquisition of the reference position;

the variation acquiring section acquires the difference between the new present position and the reference position; and the variation indicates a variation relating to at least one of an individual difference and an attaching error of the grinding tool after replacement.

* * * * *